Patented Dec. 30, 1952

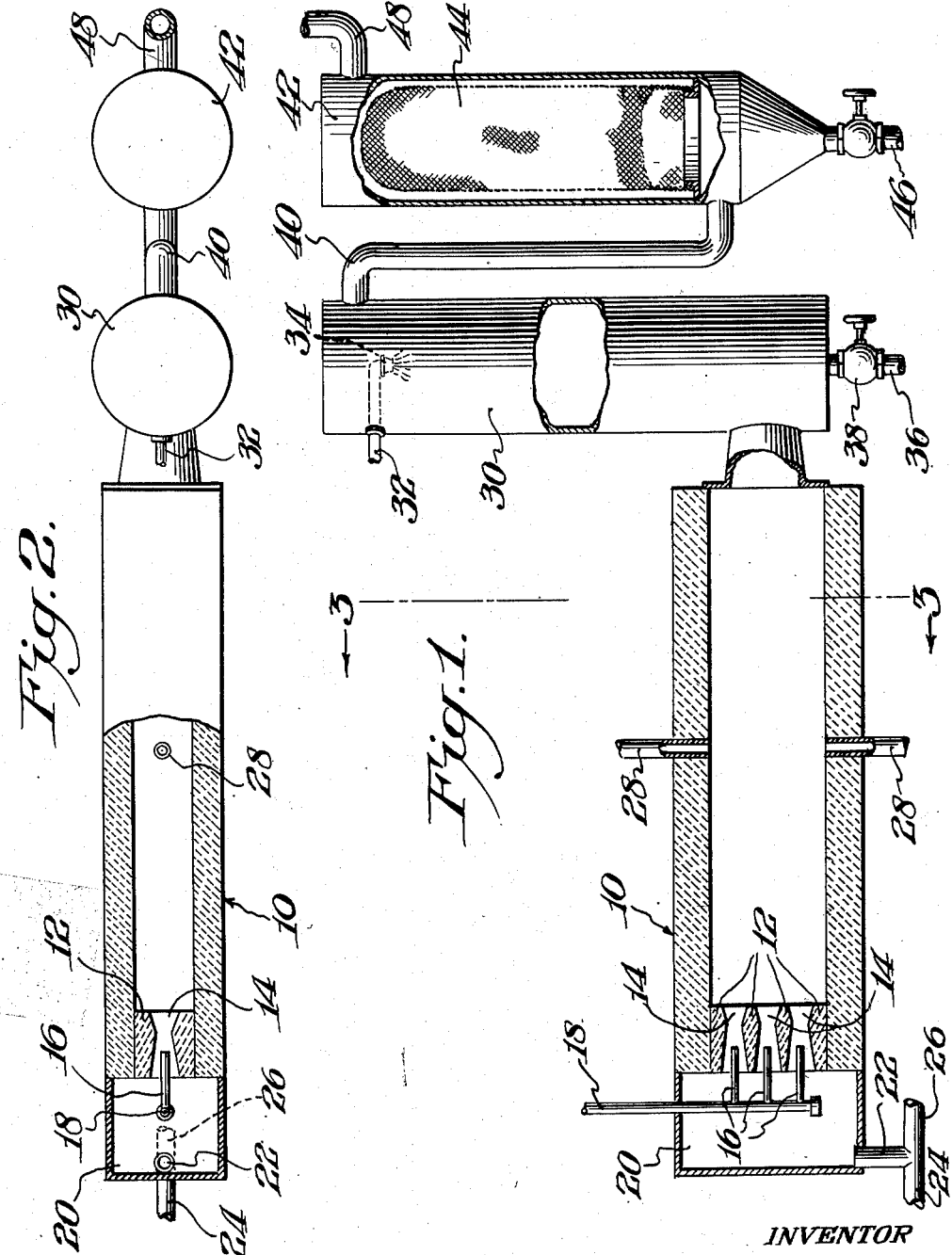

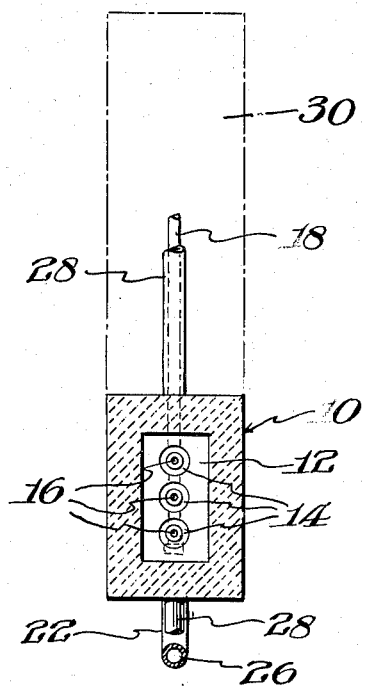
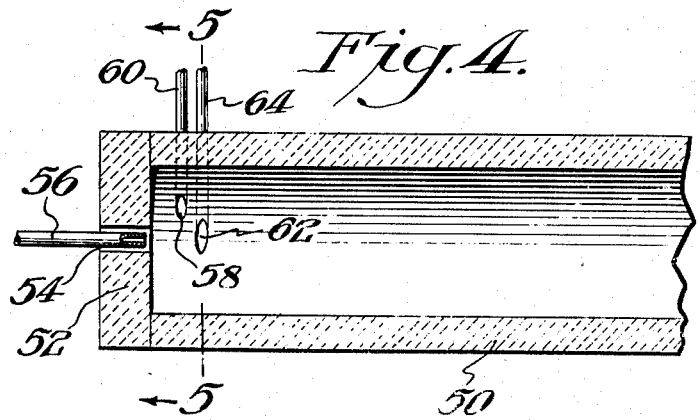
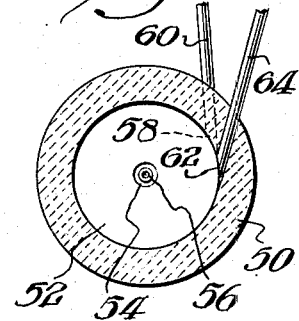

2,623,811

UNITED STATES PATENT OFFICE 2,623,811

PROCESS FOR PRODUCING CARBON BLACK AND VALUABLE BY-PRODUCT GASES

Ira Williams, Borger, Tex., assignor to J. M. Huber Corporation, Locust, N. J., a corporation of New Jersey Application November 16, 1949, Serial No. 127,578

4 Claims. (Cl. 23—209.6)

This invention relates to the manufacture of carbon black and particularly to a process for producing carbon black by the thermal decomposition of hydrocarbons and at the same time producing valuable by-product gases.

There are two main types of processes for making carbon black. One process comprises burning gaseous hydrocarbons in small flames which impinge on relatively cold channel irons and deposit carbon thereon. The carbon black, made by such process, is known as channel carbon black. While such channel process produces relatively small yields of the carbon present in the hydrocarbons, the product is usually superior to that obtained by other methods, particularly for compounding with rubber and making printing inks, because of its fine particle size, color, and surface activity.

The second most common process for making carbon black comprises thermally decomposing gaseous hydrocarbons by bringing the gaseous hydrocarbons into contact with hot gases, such as preheated gases, preformed hot combustion gases, a burning mixture of gases or causing them to flow in close proximity to burning layers of gas in a furnace or reaction chamber, flowing the mixture of carbon black particles and gases from the furnace and separating the carbon black from the gaseous products, usually by means of electrical precipitation or filters and usually cooling the mixture before separation. This method is generally called the furnace process or thermal decomposition process and the resulting carbon black is generally called furnace carbon. While furnace carbon is generally inferior in properties to channel black, the yield of carbon is very substantially higher than that obtained in the channel process and much more nearly approaches the theoretical amount of carbon present in the hydrocarbons. Also, by carefully controlling the conditions of operation, it is possible to obtain carbon black which closely approaches channel black in properties and which may be superior to channel black in some respects.

The furnace process may be carried out in various ways. A mixture of the hydrocarbons with air, in amounts sufficient to burn from about 25% to about 50% of the hydrocarbons, may be introduced into a furnace and burned, whereby part of the hydrocarbons will be consumed by combustion and produce sufficient heat to decompose the rest of the hydrocarbons. The furnace process may also be carried out by introducing into a furnace a mixture of the hydrocarbons to be burned and air, in a quantity sufficient for substantially complete combustion of the hydrocarbons, burning such mixture in the furnace, and introducing a stream of the hydrocarbons to be decomposed into the burning mixture or into the hot combustion gases a short distance beyond the flame produced by the burning mixture. A still further method of carrying out the furnace process comprises introducing into a furnace a stream of hydrocarbons surrounded by a stream of air, or thin layers of hydrocarbons and alternate thin layers of air, whereby a portion of the hydrocarbons and the air, at the interface between the layers of hydrocarbons and air, intermingle and burn to supply the heat to decompose the rest of the hydrocarbons in the core of the streams of hydrocarbons. The quality of the carbon black produced by such process is controlled largely by the temperatures, the rapidity of mixing of the hydrocarbons with the hot gases, the concentration of the hydrocarbons to be decomposed in the gaseous mixtures and the length of time that the carbon is subjected to high temperatures. Such methods of control and for producing carbon of a desired quality are well known to those skilled in the art. Such furnace processes, the apparatus employed and the methods of operation are illustrated by Patents 1,364,273 to Gerard et al.; 1,438,032 to Frost; 1,765,991 to Miller; 1,902,753 to Beaver; 1,902,797 to Burke; 1,999,541 to Keller and 2,378,055 to Wiegand et al.

The furnace processes employ air to provide the oxygen necessary for combustion of the hydrocarbons. The gaseous mixtures produced, after separation of the carbon, are sufficiently rich in hydrogen and carbon monoxide so that the mixture will burn in air. However, such gaseous mixtures have no commercial value because their thermal value is very low due to their large content of nitrogen, which cannot be separated therefrom. Mixtures of hydrogen and carbon monoxide are employed for the synthesis of unsaturated hydrocarbons and oxygenated organic liquids, such as in the Fischer-Tropsch type of synthesis. Mixtures of hydrogen and carbon monoxide, suitable for such syntheses, are frequently referred to as synthene gases. The presence of large amounts of nitrogen or carbon dioxide, in admixture with hydrogen and carbon monoxide, interferes with the condensation of the hydrogen and carbon monoxide and renders such mixtures useless as synthene gases. While carbon dioxide may be readily removed from such mixtures by well known methods, such as by absorbing it in ethanolamines, the nitrogen cannot be readily or economically removed. The large amounts of nitrogen, in the gases produced in the furnace process of producing carbon black, prevents the use of such mixtures in a Fischer-Tropsch type of synthesis. Accordingly, the gases from the furnace process have usually been discarded as waste.

In my copending application Serial No. 91,077 filed May 3, 1949 for "Process for Producing Carbon Black (now abandoned), I have disclosed that all or part of the air, in the furnace process for producing carbon black, may be replaced by substantially pure oxygen. When all or substantially all of the air is replaced by substantially pure oxygen in such process, the gaseous products of combustion and decomposition will be substantially free of nitrogen and, after removal of the carbon dioxide, will be suitable for use in the synthesis of organic compounds by the reaction of hydrogen and carbon monoxide. However, when all or substantially all of the air is replaced by oxygen, the temperature of the flames are in the neighborhood of 2700° C. to 2930° C., causing considerable difficulty in furnace maintenance and requiring the use of expensive and not readily obtainable materials for the construction of the furnace.

It is the main purpose of this invention to provide a process for simultaneously producing carbon black and valuable by-product gases by the furnace process. Another object is to provide a process for employing substantially pure oxygen in the furnace process for producing carbon black and, at the same time, controlling the conditions of the process. A further object is to provide a process for producing furnace carbon which will produce by-product gases of a composition suitable for conversion into organic compounds. Other objects are to advance the art. Still other objects will appear hereinafter.

The above and other objects may be accomplished in accordance with my invention which comprises employing, as the oxygen-containing gas required for combustion in the thermal decomposition of hydrocarbons, substantially pure oxygen and from about 3.9 to about 6.3 volumes of at least one heat-absorbing gas of the group consisting of carbon dioxide, water vapor, carbon monoxide, and hydrogen for each volume of the oxygen, while substantially excluding nitrogen from the gases. More particularly, my invention comprises the process for producing carbon black and valuable by-product gases by the thermal decomposition of hydrocarbons that decompose with the absorption of heat, by burning a gaseous mixture composed essentially of at least one fuel of the group consisting of hydrocarbons, hydrogen and carbon monoxide, substantially pure oxygen in an amount sufficient for substantially complete combustion of the fuel and, for each volume of oxygen, from about 3.9 to about 6.3 volumes of at least one heat-absorbing gas of the group consisting of carbon dioxide, water vapor, carbon monoxide and hydrogen to form hot combustion gases having a temperature in the range of from about 1200° C. to about 1900° C., substantially simultaneously contacting with such hot combustion gases substantially gaseous hydrocarbons to be decomposed, and separately collecting the carbon black and the gaseous products, such process being carried out substantially in the absence of nitrogen. Preferably, my process is carried out in an elongated, uncooled and unobstructed reaction chamber, introducing the fuel, the oxygen and the heat-absorbing gas into one end of the chamber and burning it, and simultaneously introducing the substantially gaseous hydrocarbons to be decomposed into the reaction chamber and removing the resulting combustion and decomposition products from the exit end of the reaction chamber.

By such process, I have been able to satisfactorily employ substantially pure oxygen as the sole source of the oxygen required for combustion, control the temperatures and other conditions in the process so as to control the quality of the carbon black obtained, produce desirable yields of carbon black, and simultaneously produce valuable by-product gases which are composed mainly of hydrogen and carbon monoxide and which are suitable for use in the synthesis of organic compounds by reaction of the hydrogen with the carbon monoxide. Such by-product gases also have a high B. t. u. value whereby they are valuable as a fuel.

It will be understood that ratios of volumes of gases, given herein, are to be measured at the same temperature and pressure.

The substantially gaseous hydrocarbons may be any hydrocarbons which can be vaporized without cracking or atomized in the form of a mist or spray, and which decompose with the absorption of heat. By "substantially gaseous," I mean that the hydrocarbons are in the form of a gas, vapor, mist or spray. The various hydrocarbons, which may be employed for producing furnace carbon, are well known. They include petroleum hydrocarbons and, particularly, refinery products which may be paraffinic, olefinic or aromatic in character. Natural gasoline, butane, propane and benzene are particularly useful. In the preferred form of my invention, I ordinarily employ natural gas which, as is well known, is composed substantially wholly of methane.

By substantially pure oxygen, I mean oxygen which is at least 95% pure. Such substantially pure oxygen may be obtained by any known method, such as by the fractionation of liquid air.

The fuel, which is to be burned to provide the heat for the thermal decomposition, may be substantially gaseous hydrocarbons, hydrogen, carbon monoxide or a mixture of any two or more thereof. The hydrocarbons, which are suitable as a fuel, are the same as those which are suitable for thermal decomposition to produce furnace carbon. The hydrogen and carbon monoxide may be separately produced or obtained from available commercial sources or they may be the mixture obtained as the by-product gases in the process.

The heat-absorbing gases may be carbon dioxide, carbon monoxide, hydrogen or water vapor, as in the form of steam, or any mixture of any two or more thereof, such as the gases recovered from the process. When hydrogen or carbon monoxide or mixtures thereof are employed as heat-absorbing gases, at least a portion of them will be consumed by the oxygen and hence an excess thereof is used, such excess constituting the heat-absorbing gas; in other words, the amount of hydrogen and carbon monoxide employed will be equal to that sufficient for complete consumption of the oxygen plus an excess of from about 3.9 to about 6.3 volumes for each volume of oxygen. When water vapor or steam is employed as the heat-absorbing gas, it is substantially completely converted to hydrogen and carbon monoxide by the decomposition. When carbon dioxide is employed as the heat-absorbing gas, much of it becomes reduced to carbon monoxide, a valuable constituent of the exit gases. The heat-capacity per cubic foot of hydrogen, carbon dioxide, carbon monoxide and water vapor are very nearly the same. Hence, they are substantially equally effective for absorbing and controlling the heat and the temperatures obtained in the process.

The heat-absorbing gases control the temperatures obtained by the combustion. When the proportion of heat-absorbing gases to the oxygen is substantially the same as the proportion of other gases to oxygen in the air, the temperatures obtained will closely approach those obtained with air. The temperatures of the flames and of the combustion gases can then be varied by variation in the proportion of fuel to oxygen and heat-absorbing gases, substantially in the manner well known to and employed by the art when air is employed as the oxygen-containing gas for the combustion. By reducing the proportion of heat-absorbing gas to oxygen, the temperatures of the flames and of the combustion gases can be increased. Increase in the proportion of heat-absorbing gas to oxygen, results in lower temperatures in the flames and in the combustion gases. The practical usable proportions of heat-absorbing gas to oxygen are in the range of from about 3.9 to about 6.3 volumes of heat-absorbing gas to each volume of oxygen. Preferably, I employ from about 4 to about 5 volumes of the heat-absorbing gas for each volume of oxygen and produce hot combustion gases having a temperature in the preferred range of from about 1250° C. to about 1700° C.

Where the hydrocarbons, to be decomposed, are to be separately injected into a flame or into hot combustion gases, the flame or hot combustion gases are formed by burning a combustible mixture of the fuel, substantially pure oxygen and the heat-absorbing gas. Such combustible mixture may be prepared in any desired manner, either before injection into the furnace or by simultaneously injecting into the furnace the individual components or mixtures of two or more thereof so that the combustible mixture is formed in the furnace.

If desired, a mixture of the hydrocarbons to be decomposed, the heat-absorbing gases and the substantially pure oxygen, in a proportion insufficient to burn all of the hydrocarbons, may be injected into the furnace and burned for partial combustion and decomposition of the hydrocarbons. Such mixture may be produced in any desired manner, either before introduction into the furnace or mixed in the furnace. In this case, hydrogen or carbon monoxide may be employed in a proportion to consume the oxygen so as to act as the fuel or in excess so as to act as both the fuel and heat-absorbing gas, whereby little of the hydrocarbons will be consumed by combustion because hydrogen and carbon monoxide burn more readily than the hydrocarbons.

When the carbon black is to be produced by flowing contiguous streams of hydrocarbons to be decomposed and oxygen-containing gases and burning the mixture formed at the interface, it will generally be preferable to employ carbon dioxide or water vapor or a mixture thereof as the heat-absorbing gases, as they permit more ready and flexible control. However, hydrogen or carbon monoxide or both may also be employed in this process, if desired. Carbon monoxide or hydrogen or mixtures thereof, in the proportion for substantially complete consumption of the oxygen, may be mixed with the hydrocarbons, and carbon dioxide or water vapor or both may be employed as the heat-absorbing gases. Also, carbon monoxide, hydrogen or mixtures thereof, in a proportion sufficient to combine with the oxygen and to also act as the heat-absorbing gas, may be mixed with the hydrocarbons. The carbon-monoxide, hydrogen, or mixtures thereof may be mixed with the oxygen in an amount sufficient for substantially complete consumption of the oxygen together with the other heat-absorbing gases or in an amount to consume the oxygen and to also act as the heat-absorbing gases.

The "hydrocarbons to be decomposed" are those which are to be converted to carbon and hydrogen and are exclusive of those which are burned as fuel. The relative proportions of the hydrocarbons to be decomposed to the hot combustion gases may be widely varied in the manner well known to the art and the proportions employed in any particular case is a matter of judgment within the skill of the art. The patents previously referred to herein illustrate such variations and some of the principles involved. The exact ratios will depend upon the type of carbon to be produced, the temperature of the combustion gases, the temperature of the hydrocarbons to be decomposed, and the kind of hydrocarbons which is to be decomposed. The type of carbon is largely dependent upon the temperature in the furnace and the length of time that the carbon is subjected to such temperature. The temperature in the furnace, after the system reaches equilibrium conditions, is determined largely by the heat given off by the combustion, the heat absorbed in the decomposition of the hydrocarbons and the heat capacity of the mass of gases. Thus, with a ratio of fuel, oxygen and heat-absorbing gases to produce combustion gases of a specified temperature, the heat in the furnace may be controlled within any desired range of temperatures by control of the rate of injection of the hydrocarbons to be decomposed to thereby control the type of carbon produced. For example, if it is desired to produce a high modulus furnace carbon of the ordinary type by the decomposition of natural gas, about 1 volume of natural gas would be injected into about 24 volumes of combustion gases having a temperature of about 1425° C. Other grades of carbon may then be obtained by varying the ratio of natural gas over the range of from about 15 volumes of combustion gases to about 35 volumes of combustion gases for each volume of natural gas. Ordinarily, the ratio of hydrocarbons to be decomposed to the hot combustion gases will be within the range of from about 7 volumes of combustion gases to about 35 volumes of combustion gases for each volume of hydrocarbons, all measured at the same temperature and pressure.

The mixture of carbon and gases of combustion and decomposition, leaving the furnace, will be separated and separately collected. The carbon may be precipitated from the gases by electrical precipitation as is well known to the art. Usually, the mixture of carbon and gases of combustion and decomposition will be cooled immediately upon leaving the furnace and before separation and collection. Such cooling may be accomplished by natural radiation or by a water spray as is well known to the art. A particularly advantageous method of cooling is by mixing the hot mixture with cooled heat-absorbing gases of the character hereinbefore disclosed, such as hydrogen, carbon monoxide, carbon dioxide, water vapor or a mixture of any two or more thereof such as cooled gases of combustion and decomposition produced and recovered in the process. The principles, methods and apparatus for cooling with such gases are disclosed in my copending application Serial No. 91,077 hereinbefore referred to. In cooling with such cooled inert heat-absorbing gases, it will be necessary, of course, to avoid gases containing substantial amounts of nitrogen.

My process may be carried out in apparatus of the character heretofore employed for producing carbon by the furnace process, such as those disclosed in the patents hereinbefore referred to and that disclosed in my application Serial No. 91,077. Two suitable types of apparatus, which have been employed in carrying out my process, are illustrated somewhat diagrammatically in the accompanying drawings in which;

Fig. 1 is a side elevation, partly in section, of one suitable form of apparatus;

Fig. 2 is a plan view of the apparatus of Fig. 1, partly in section;

Fig. 3 is a vertical cross-sectional view of the furnace of Fig. 1, taken on line 3—3 and looking in the direction of the arrows;

Fig. 4 is a longitudinal sectional view of the burner end of a second suitable type of furnace; and Fig. 5 is a vertical cross-sectional view of the furnace of Fig. 4, taken on the line 5—5.

Referring more particularly to Figs. 1 to 3, the furnace comprises an unobstructed, elongated, rectangular reaction tube, 10, the walls of which are composed of a heat-resisting and heat-insulating material of the usual type. At the entrance end of the furnace, there is provided a ceramic burner block 12 provided with a plurality of round openings 14 for admission of the gaseous mixture to be burned into the reaction tube. Each of these openings is contracted intermediate its length to form a venturi. Extending into the entrance ends of the burner openings 14 are fuel pipes 16 connected to a distributing pipe 18, for introducing gaseous fuel into the furnace. The fuel supply pipe 18 extends into a header 20 for the oxygen-containing gas. The oxygen-containing gas is introduced through a feed pipe 22 connected with a supply pipe 24 for the heat-absorbing gas or gases and an oxygen-supply pipe 26. Supply pipes 28 are provided for introducing hydrocarbons to be decomposed into the furnace and into the hot combustion gases.

The exit end of the reaction tube is connected to a spray tower 30 for cooling the mixture. A water supply pipe 32 is provided at the top of the spray tower and terminates in a spray nozzle 34 of usual construction. The spray tower is provided with a drain pipe 36 controlled by a valve 38 for drawing off excess water. The upper end of the spray tower is connected with the lower end of a carbon collecting apparatus 42 by means of a conduit 40. As shown, the carbon collecting apparatus comprises a filter bag 44 for filtering the carbon from the gaseous products and a valved pipe 46 for drawing off the collected carbon. The upper end of the carbon collecting apparatus is provided with a conduit 48 for drawing off the gaseous products. Such conduit 48 is connected with storage tanks, not shown, for collecting the gaseous products of the process.

In operation, the gaseous fuel will be injected into the Venturi openings of the burner through pipes 16. The heat-absorbing gases will be introduced through pipe 24 and the oxygen through pipe 26 and the two gases will pass through pipe 22 into the header 20 where they will mix and pass into the Venturi openings 14. The gaseous fuel and the oxygen-containing gas will mix in the Venturi openings and, upon passing out of the Venturi openings, will be ignited and burn to form the combustion gases. The hydrocarbons to be decomposed will be injected into the hot combustion gases through pipes 28, whereupon they will be decomposed by the heat of the combustion gases and the mixture will then pass to the cooling and collecting apparatus. If desired, the heat-absorbing gases may be mixed with the fuel gas and introduced through pipes 18 and 16. In such latter event, pipe 24 will be omitted or will be closed off by means of a valve, not shown.

Figs. 4 and 5 illustrate a furnace which comprises an unobstructed, elongated, cylindrical reaction tube 50, the walls of which are made of a suitable heat-resisting and heat-insulating material. The entrance end of the reaction chamber is closed by a ceramic block 52 provided with a central opening 54. A hydrocarbon injection tube 56 extends into the opening 54 and is directed axially of the reaction chamber. Tangential openings 58 and 62 connect with gas supply pipes 60 and 64 for introducing any combination of oxygen and heat-absorbing gases. The exit end of the reaction tube 50 is connected with cooling and collecting apparatus similar to that shown in Figs. 1 and 2.

One method of operating the apparatus of Figs. 4 and 5 comprises introducing air through pipe 64 and port 62 and introducing natural gas through pipe 60 and port 58 and burning the resulting mixture to heat the reaction tube to the desired temperature. The air and gas move in a whirling spiral direction through the reaction tube and become intimately mixed to form a combustible mixture. After the reaction tube has been heated to the desired temperature, oxygen was introduced through pipe 64 and port 62, a gaseous mixture of fuel and heat-absorbing gases were introduced through pipe 60 and port 58. Such gases formed a whirling mixture of burning gases and combustion gases. The hydrocarbons to be decomposed were injected through the pipe 56 and into the whirling mass of burning gases and combustion gases.

In order to more clearly illustrate my invention and representative modes of carrying the same into effect, the following examples are given.

*Example I*

A furnace, designed as in Figs. 1 to 3, had a reaction tube 9 in. wide by 16 in. high and 11 feet in length. Natural gas, at the rate of 12 cubic feet per minute, was introduced through the jets 16. Air, at the rate of 155 cubic feet per minute, was introduced through the pipe 22. The temperature of the combustion gases, before introduction of the hydrocarbons to be decomposed, was 1450° C. Natural gas was introduced through the ports 28 at the rate of 22 cubic feet per minute. The gases of combustion and decomposition were cooled quickly and the carbon collected in the bag filter. The yield of carbon was 6.3 pounds for each 1000 cubic feet of natural gas employed. The gases, resulting from the combustion and decomposition, had the following composition:

| | Per cent |
|---|---|
| Carbon dioxide | 5.18 |
| Carbon monoxide | 8.70 |
| Hydrogen | 11.25 |
| Nitrogen | 73.08 |
| Methane | 1.01 |
| Oxygen | 0.78 |

The operation was repeated without air, by introducing 25 cubic feet of oxygen through pipe 26 and 130 cubic feet of carbon dioxide through pipe 24. The combustion gases had a temperature of about 1450° C. The yield of carbon was 5.8 pounds for each 1000 cubic feet of natural gas employed. The gasses, from the combustion and decomposition, had the following composition:

| | Per cent |
|---|---|
| Carbon dioxide | 73.58 |
| Carbon monoxide | 13.97 |
| Hydrogen | 10.12 |
| Nitrogen | 1.31 |
| Methane | 0.62 |
| Oxygen | 0.50 |

After removal of the carbon dioxide, which can be reused, the remainder of the gas mixture is suitable for condensation to produce unsaturated hydrocarbons and oxygenated organic liquids. The nitrogen was present in the natural gas. If the oxygen is decreased to about 21 cubic feet without altering the amounts of the other gases, the temperature of the combustion gases will decrease to about 1200° C. If the oxygen is increased to about 33 cubic feet without altering the amounts of the other gases, the temperature will increase to about 1900° C. By increasing the amount of carbon dioxide to about 163 cubic feet without changing the amounts of the other gases, the temperature of the combustion gases may be decreased to about 1200° C.; and by decreasing the carbon dioxide to about 74 cubic feet, the temperature may be increased to about 1900° C.

The process was repeated without air, by introducing a mixture, consisting of 25 cubic feet of oxygen and 130 cubic feet of steam, through pipe 22. The combustion gases had a temperature of about 1490° C. The yield of carbon was 5.6 pounds for each 1000 cubic feet of natural gas employed and the gases produced had the following composition:

| | Per cent |
|---|---|
| Carbon dioxide | 8.32 |
| Carbon monoxide | 31.13 |
| Hydrogen | 54.02 |
| Nitrogen | 3.13 |
| Methane | 2.10 |
| Oxygen | 1.30 |

After removal of the carbon dioxide, this gas is suitable for condensation to hydrocarbons or for other uses requiring gas of high B. t. u. value.

*Example II*

The apparatus of Figs. 1 to 3 was employed. 125 cubic feet per minute of a mixture, composed of 4% methane, 32% carbon monoxide, 56% hydrogen and 10% carbon dioxide, was led into the furnace through the fuel pipes 16. This was partially burned by leading in 22 cubic feet per minute of oxygen through pipe 22. This is only 38.3% enough oxygen to burn the combustible portion of the gases, so that the remainder of the gases were available as heat-absorbing gases to control the flame temperature. The temperature of the combustion gases, into which the hydrocarbons were injected, was about 1700° C. Natural gas, at the rate of 23 cubic feet per minute, was injected into the hot gases through ports 28. The gases were spray cooled and 6.4 pounds of carbon were recovered for each 1000 cubic feet of hydrocarbon gas employed. The composition of the resulting gases was as follows:

| | Per cent |
|---|---|
| Carbon dioxide | 13.3 |
| Carbon monoxide | 33.7 |
| Hydrogen | 48.8 |
| Methane | 2.5 |
| Oxygen | 0.4 |
| Nitrogen | 1.6 |

After absorbing the carbon dioxide by scrubbing the gaseous mixture with triethanol amine, the resulting mixture of gases contained 38.8% of carbon monoxide and 56.5% of hydrogen.

*Example III*

The apparatus of Figs. 4 and 5 was employed, in which the reaction tube was 6 inches in diameter and 12 feet long. The furnace was first heated by introducing air through port 62 and natural gas through port 58. After the furnace had reached a temperature of about 1400° C., a hydrocarbon oil, having an aromatic content of about 35%, was vaporized and introduced into the furnace through the pipe 56 at the rate of 0.4 gallon per minute. Oxygen was introduced into the furnace through port 62 at the rate of 58 cubic feet per minute. A mixture of gases, composed of approximately 12% carbon dioxide, 32% carbon monoxide and 56% hydrogen, was introduced through port 58 at the rate of 250 cubic feet per minute. The temperature of the gases, three feet from the entrance, was 1250° C. Carbon was produced at the rate of about 2.8 pounds per gallon of oil. The resulting gases had the following composition:

| | Per cent |
|---|---|
| Carbon dioxide | 10.4 |
| Carbon monoxide | 30.8 |
| Hydrogen | 56.9 |
| Other | 1.9 |

In this case, the composition of the resulting gases is similar to the composition of the original diluting gases, but the total volume is greatly increased.

It will be understood that the preceeding examples are given for illustrative purposes solely and my invention is not to be limited to the specific embodiments disclosed therein, but I intend to cover my invention broadly as in the appended claims. Many variations and modifications in the types of burners and furnaces, the collecting system, the modes of operating the furnaces shown in the drawings and the modes of carrying my invention into effect, without departing from the spirit or scope of my invention, will be readily apparent to those skilled in the art.

It will be apparent that, by my invention, I am able to produce carbon black by the furnace process and simultaneously produce valuable by-product gases. Such by-product gases are particularly valuable for use in the synthesis of hydrocarbons and other organic compounds, which syntheses involve the reaction of hydrogen and carbon monoxide. Such by-product gases are also useful as fuels as they have a high thermal value. At the same time, my process permits the use of oxygen for producing the heat required to decompose the hydrocarbons without employing excessively high temperatures and which permits easy control of the temperatures and other conditions in the furnace within a wide range and particularly within the range usually desired for producing furnace black. Therefore, it will be apparent that my invention constitutes a valuable advance and contribution to the art.

I claim:
1. The process for producing carbon black and valuable by-product gases by the thermal decomposition of hydrocarbons that decompose with the absorption of heat which comprises introducing into one end of an elongated, uncooled and unobstructed reaction chamber a gaseous mixture composed essentially of at least one fuel of the group consisting of hydrocarbons, hydrogen and carbon monoxide, substantially pure oxygen in an amount sufficient for substantially complete combustion of the fuel and from about 3.9 to about 6.3 volumes of at least one heat-absorbing gas of the group consisting of carbon dioxide, water vapor, carbon monoxide, and hydrogen for each volume of oxygen, burning the gaseous mixture to form hot combustion gases having a temperature in the range of from about 1200° C. to about 1900° C. in the reaction chamber, simultaneously introducing substantially gaseous hydrocarbons to be decomposed into the reaction chamber in a proportion of 1 volume of the gaseous hydrocarbons to from about 7 to about 35 volumes of the combustion gases, removing the resulting combustion and decomposition products from the exit end of the reaction chamber, and separately collecting the carbon black and the gaseous products, such process being carried out substantially in the absence of nitrogen.

2. The process for producing carbon black and valuable by-product gases by the thermal decomposition of hydrocarbons that decompose with the absorption of heat which comprises introducing into one end of an elongated, uncooled and unobstructed reaction chamber a gaseous mixture composed essentially of at least one fuel of the group consisting of hydrocarbons, hydrogen and carbon monoxide, substantially pure oxygen in an amount sufficient for substantially complete combustion of the fuel and from about 4 to about 5 volumes of at least one heat-absorbing gas of the group consisting of carbon dioxide, water vapor, carbon monoxide and hydrogen for each volume of oxygen, burning the gaseous mixture to form hot combustion gases having a temperature in the range of from about 1250° C. to about 1700° C. in the reaction chamber, simultaneously introducing substantially gaseous hydrocarbons to be decomposed into the reaction chamber in a proportion of 1 volume of the gaseous hydrocarbons to from about 7 to about 35 volumes of the combustion gases, removing the resulting combustion and decomposition products from the exit end of the reaction chamber, and separately collecting the carbon black and the gaseous products, such process being carried out substantially in the absence of nitrogen.

3. The process for producing carbon black and valuable by-product gases by the thermal decomposition of natural gas which comprises introducing into one end of an elongated, uncooled and unobstructed reaction chamber a gaseous mixture composed essentially of natural gas as a fuel, substantially pure oxygen in an amount sufficient for substantially complete combustion of the natural gas fuel and from about 3.9 to about 6.3 volumes of at least one heat-absorbing gas of the group consisting of carbon dioxide, water vapor, carbon monoxide and hydrogen for each volume of oxygen, burning the gaseous mixture to form hot combustion gases having a temperature in the range of from about 1200° C. to about 1900° C. in the reaction chamber, simultaneously introducing natural gas to be decomposed into the hot combustion gases in the reaction chamber in a proportion of 1 volume of natural gas to from about 7 to about 35 volumes of the combustion gases, removing the resulting combustion and decomposition products from the exit end of the reaction chamber, and separately collecting the carbon black and the gaseous products, such process being carried out substantially in the absence of nitrogen.

4. The process for producing carbon black and valuable by-product gases by the thermal decomposition of natural gas which comprises introducing into one end of an elongated, uncooled and unobstructed reaction chamber a gaseous mixture composed essentially of at least one fuel of the group consisting of hydrocarbons, hydrogen and carbon monoxide, substantially pure oxygen in an amount sufficient for substantially complete combustion of the fuel and from about 3.9 to about 6.3 volumes of at least one heat-absorbing gas of the group consisting of carbon dioxide, water vapor, carbon monoxide and hydrogen for each volume of oxygen, burning the gaseous mixture to form hot combustion gases having a temperature in the range of from about 1200° C. to about 1900° C. in the reaction chamber, simultaneously introducing natural gas to be decomposed into the burning gaseous mixture in a proportion of 1 volume of natural gas to from about 7 to about 35 volumes of the combustion gases, removing the resulting combustion and decomposition products from the exit end of the reaction chamber, and separately collecting the carbon black and the gaseous products, such process being carried out substantially in the absence of nitrogen.

IRA WILLIAMS.

REFERENCES CITED

The following references are of record in the file of this patent:

UNITED STATES PATENTS

| Number | Name | Date |
|---|---|---|
| 1,134,416 | Pictet | Apr. 6, 1915 |
| 1,844,327 | Lyder | Feb. 9, 1932 |
| 1,902,797 | Burke | Mar. 21, 1933 |
| 2,163,630 | Reed | June 27, 1939 |
| 2,199,475 | Wilcox | May 7, 1940 |
| 2,322,989 | Wilcox | June 29, 1943 |
| 2,375,795 | Krejci | May 15, 1945 |
| 2,440,424 | Wiegand et al. | Apr. 27, 1948 |
| 2,475,282 | Hasche | July 5, 1949 |
| 2,486,879 | Rees et al. | Nov. 1, 1949 |
| 2,564,736 | Stokes | Aug. 21, 1951 |